United States Patent [19]
Takami et al.

[11] Patent Number: 6,131,282
[45] Date of Patent: Oct. 17, 2000

[54] METHOD OF MANUFACTURING A VALVE ELEMENT HAVING A SPHERICAL SURFACE ON TIP END PORTION

[75] Inventors: Kunihiko Takami; Yasuhiko Takami, both of Aichi, Japan

[73] Assignee: Kabushiki Kaisha Chubu Tepuro, Nagoya, Japan

[21] Appl. No.: 09/141,512

[22] Filed: Aug. 27, 1998

[30] Foreign Application Priority Data

Sep. 1, 1997 [JP] Japan .................................. 9-236131

[51] Int. Cl.⁷ ...................................................... B23P 15/00
[52] U.S. Cl. .................................. 29/890.12; 29/890.127; 29/890.13
[58] Field of Search ........................ 29/890.127, 890.13, 29/890.12; 72/376, 377

[56] References Cited

U.S. PATENT DOCUMENTS

| | | | |
|---|---|---|---|
| 4,336,920 | 6/1982 | Murray | 29/890.127 |
| 4,525,910 | 7/1985 | Boehmer | 29/890.127 |
| 5,906,046 | 5/1999 | Abplanalp et al. | 29/890.127 |

*Primary Examiner*—Irene Cuda
*Attorney, Agent, or Firm*—Finngan, Henderson, Farabow, Garrett & Dunner

[57] ABSTRACT

A method of manufacturing a valve element with a spherical surface on a tip end thereof by first molding a tip end portion 3 of a material 14 into a truncated cone-like shape and then cold-forging the end portion 3 with a die having a semi-spherical recessed surface thereby to mold a tip end of the end portion 3 into a spherical surface. At this time, the previously truncated cone-like shaped end portion 3, starting with the tapered tip end portion, is pressure-welded to the semi-spherical recessed surface, so that the tip of the material 14 is all plastically deformed along the semi-spherical recessed surface, thereby completing the molding of the spherical surface.

2 Claims, 11 Drawing Sheets

METHOD OF MANUFACTURING A VALVE ELEMENT HAVING A SPHERICAL SURFACE ON TIP END PORTION

BACKGROUND OF THE INVENTION

1. Field of the Invention

The present invention relates to an axial valve element having a spherical surface on its tip end portion and more particularly to a method of manufacturing the valve element with the spherical surface.

2. Description of Related Art

Conventionally, there has been known, as a valve element applied to a hydraulic valve, an axial valve element having a spherical surface on the tip end portion thereof. Moving the spherical surface close to or away from a seat allows the opening of the hydraulic valve to be adjusted and the flow rate of liquid flowing through the valve to be changed. In this case, if the valve element is brought into contact with the seat and the tip-end spherical surface of the valve does not match the seat, then leakage of fluid may occur. For that reason, the spherical surface requires strict molding accuracy.

Meanwhile, to obtain a valve element with a spherical surface as stated above, several manufacturing methods have been proposed. The first method is, for example, to prepare a steel ball in advance and embed it in a recessed portion formed on the tip end portion of an axial valve element. Although a valve element having a highly accurate spherical surface is provided, this method requires preparing the material of the axial valve element and the steel ball separately and sophisticated technique for embedding the steel ball. This results in an increase in manufacturing costs.

It is possible to shave the tip end portion of the axial valve element into a spherical surface with a turning tool so as to make manufacturing process relatively easy. With this method, however, shavings remain on the spherical surface. As a result, the accuracy of the spherical surface tends to be lowered.

When it comes to an easy molding method, meanwhile, a cold forging method is also proposed. The method is to compress and then plastically deform the material of an axial valve element with a die in an ordinary temperature. FIGS. 16 through 19, which are an example of the valve element, shows how a spherical surface is molded on the tip end portion of the material by cold forging. FIG. 16 shows the tip of a material 41. Specifically, FIG. 16 shows a state in which the tip end portion 41a of the material 41 has been cut simply in perpendicular direction. FIGS. 17 and 18 show the process in which a special flange 42 is molded on the axis of the material 41. Here, a special die is used for molding the flange 42. FIG. 19 shows a state after the spherical surface has been molded on the tip end portion 41a of the material 41. In this case, the tip end of the material 41 is compressed within a die 44 having a semi-spherical, recessed surface 43 on its tip end portion, as shown in FIG. 20.

According to the cold-forging molding method stated above, the grinding undercut of the fill on the periphery of the tip end portion 41a of the material 41 remains at the time of die molding and tends to interfere with plastic deformation. Due to this, as shown in FIG. 20, molding is forced to be finished incompletely before all parts of the tip end portion 41a of the material 41 are press-welded to the semi-spherical, recessed surface 43. That is to say, the fill on the periphery of the tip end portion 41a remains incompletely deformed on the tip end along the semi-spherical, recessed surface 43. In this way, the tip end portion 41a of the material 41 could not sufficiently be formed by the conventional and ordinal cold forging.

SUMMARY OF THE INVENTION

The present invention has been made in view of the above circumstances and has an object to overcome the above problems and to provide a method of manufacturing a valve element having an accurate spherical surface on a tip end portion thereof.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a method of manufacturing a valve element having a spherical surface on a tip end thereof by forging an axial material, the method including a first step of molding a tip end portion of the material into a tapered end portion, and a second step of forging the tapered end portion molded in the first step by means of a mold die provided with a semi-spherical recessed surface to mold the tip end of the tapered end portion into a spherical surface.

In the above method, the tip end of the material, which has been formed in a tapered shape in advance, is forged with a die provided with a semi-spherical recessed surface. At this time, the tip of the material, starting with the tapered tip end portion, is sequentially pressed to the semi-spherical recessed surface, so that all parts of the tip end portion of the material are plastically deformed along the semi-spherical recessed surface, completing the molding of the spherical surface. Accordingly, an axial valve element with an accurate spherical tip surface can be manufactured.

In the present invention, the tapered shape of the material formed in the first step is preferably a cone or a truncated cone shape.

In the present invention, preferably, the cone or truncated cone shaped tip surface of the material is formed into a spherical surface.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of one preferred embodiment of a method of manufacturing a valve element having a spherical surface on the tip end portion thereof embodying the present invention will now be given referring to the accompanying drawings.

Figure 1:
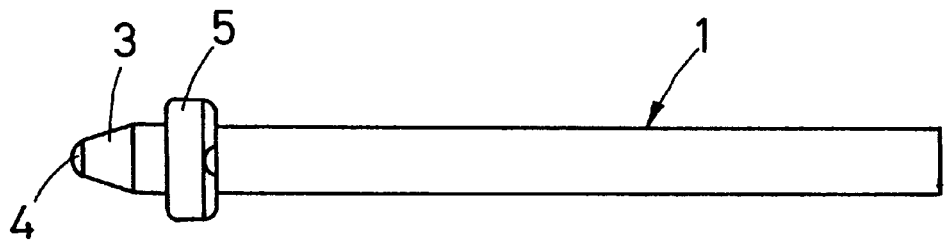
FIG. 1 is a plane view of an axial valve element in an embodiment according to the present invention.
Figure 2:
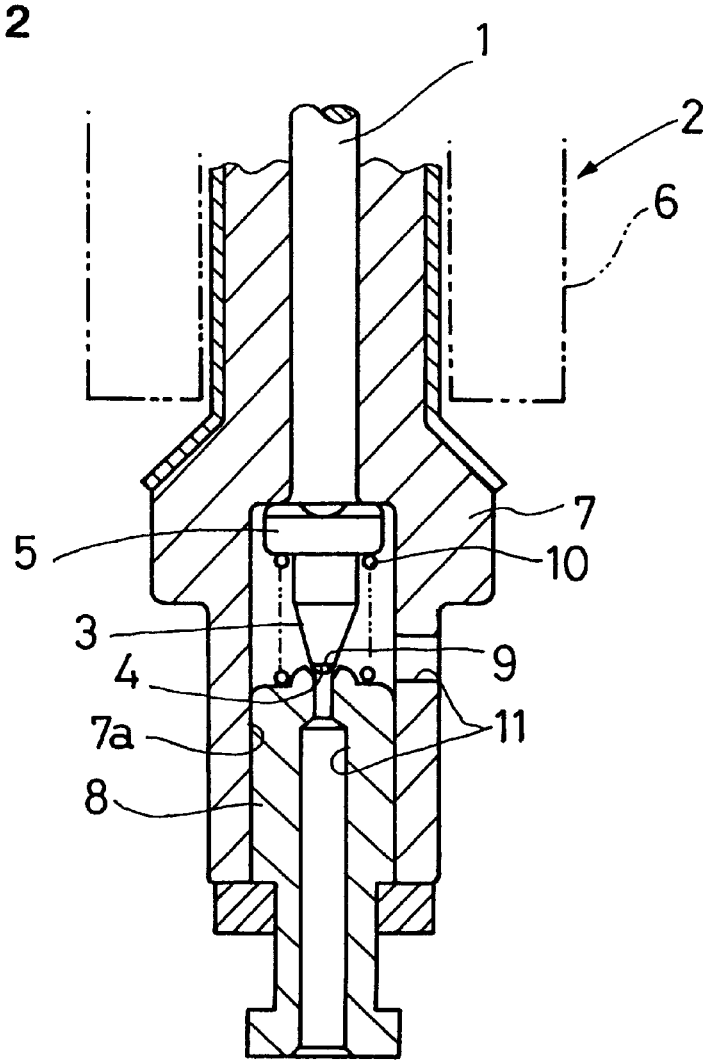
FIG. 2 is a cross sectional view of a schematic structure of a hydraulic valve which uses the valve of the invention.

The manufacturing method in this embodiment is to manufacture a valve element having a spherical surface on the tip end portion thereof by cold-forging an axial material. FIG. 1 shows an axial valve element 1. FIG. 2 shows a schematic structure of an electromagnetic hydraulic valve 2 to which the valve element 1 is applied.

As shown in FIG. 1, the valve element 1 has a tapered tip 3. The tip end portion of the tip 3 has a high-accuracy spherical surface 4. The valve element 1 also has a flange 5 near the tip 3.

As shown in FIG. 2, the hydraulic valve 2 comprises a solenoid 6, a casing 7 arranged in the center of the solenoid 6 and a plug 8 fitted into a hole 7a of the casing 7. The valve element 1 is fitted to be movable to the center of the casing 7 in the axial direction. The plug 8 includes a seat 9 for the valve element 1. The spherical surface 4 of the tip end portion can contact with the seat 9. A spring 10 is inserted between the flange 5 of the valve element 1 and the plug 8.

If the solenoid 6 is selectively excited or demagnetized, the valve element 1 reciprocates in the axial direction to make the spherical surface 4 away from or contact with the seat 9. This enables the opening of the hydraulic valve 2 to be adjusted and the flow rate of fluid flowing through a passage 11 formed in the casing 7 and plug 8 to be changed. In this case, if the spherical surface 4 contacts with the seat 9 and does not match the seat 9, then leakage of fluid may occur. Considering this, the spherical surface 4 requires strict molding accuracy.

According to this embodiment, the valve element 1 having a high-accuracy spherical surface 4 on the tip end portion as mentioned above is manufactured by the following method.

Figure 3:
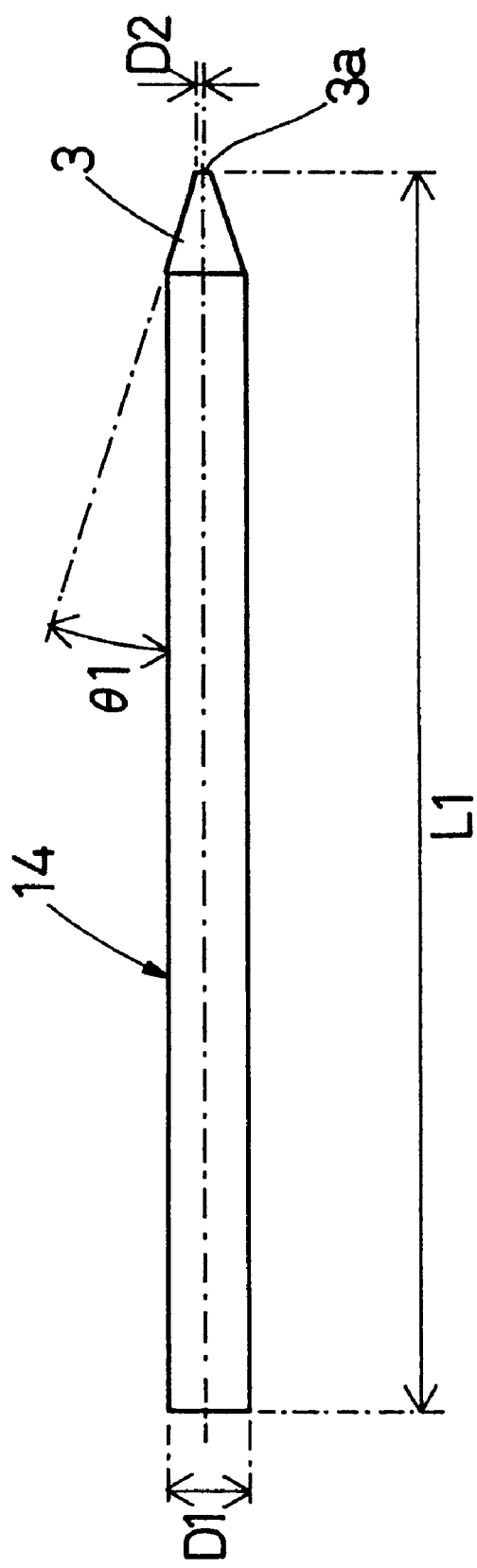
FIG. 3 is a plane view of a material of the valve element in the embodiment.

FIG. 3 shows an axial material 14 used for manufacturing the valve element 1. The material 14 is obtained by cutting a wire rod made of stainless steel to have a predetermined length and by molding one end of the cut piece into truncated cone shape in a preparation step. In this embodiment, the tip 3 of the material 14 is cut and molded into tapered, truncated cone shape. In this embodiment, the length $L_1$ of the material 1 is typically set at 34 mm and the axial diameter $D_1$ is typically set at 2.07 mm. Likewise, the outer diameter $D_2$ of the tip end portion 3a of the tip 3 is typically set at 0.2 mm, or about one-tenth the diameter $D_1$, and the tilt angle $\theta_1$ of the tip 3 is typically set at about 20°. The preparation step for molding the material 14 in advance corresponds to the first step of the present invention.

Figure 4:
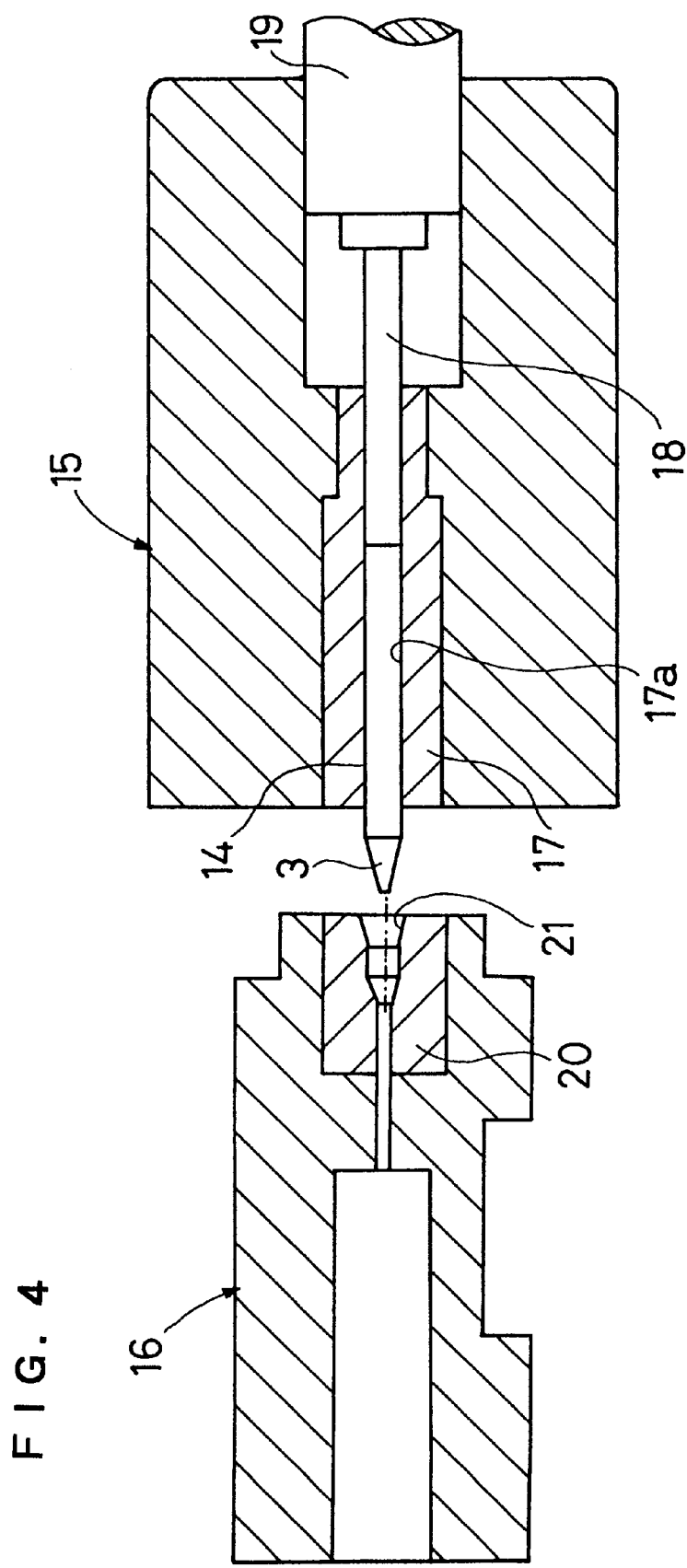
FIG. 4 is a cross sectional view of a main part of a forging device in a first molding step in the embodiment according to the present invention.
Figure 5:
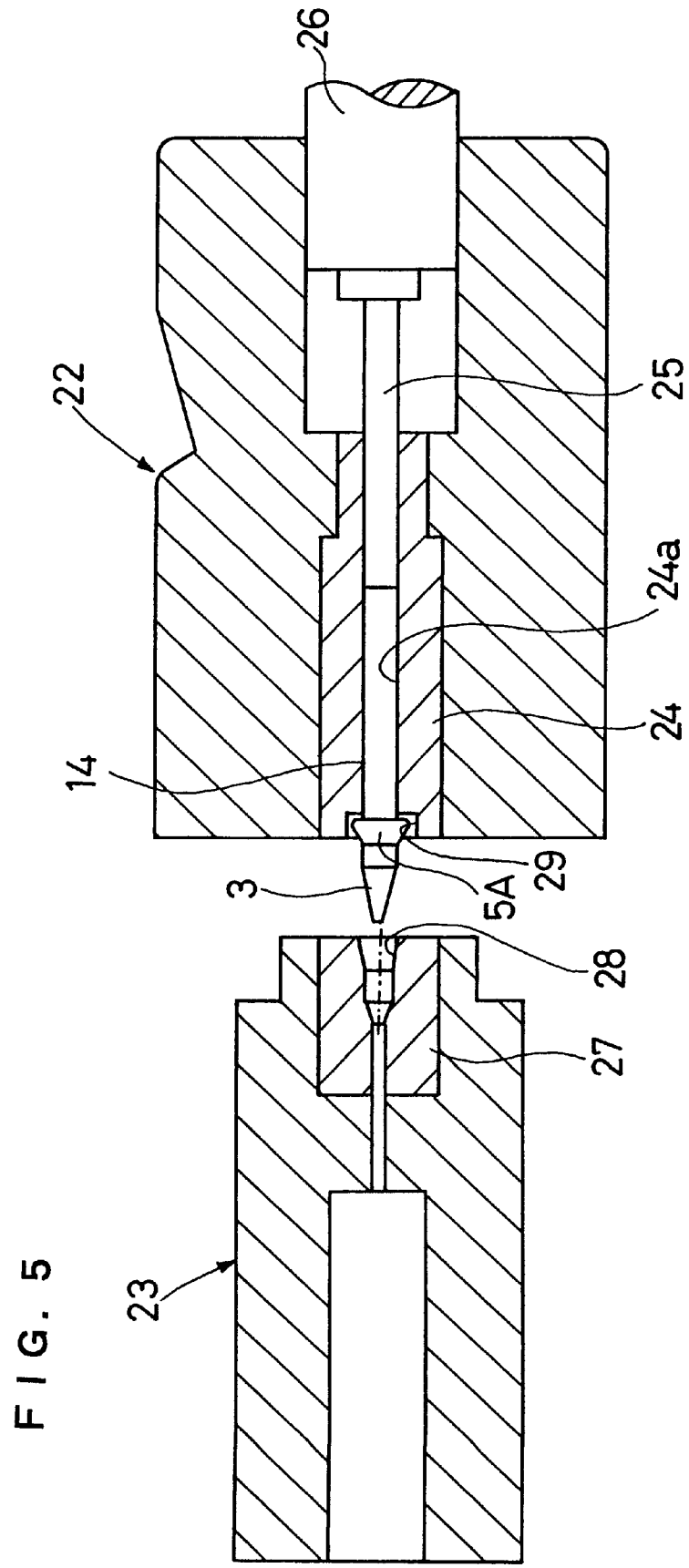
FIG. 5 is a cross sectional view of a main part of another forging device in a second molding step in the embodiment.
Figure 6:
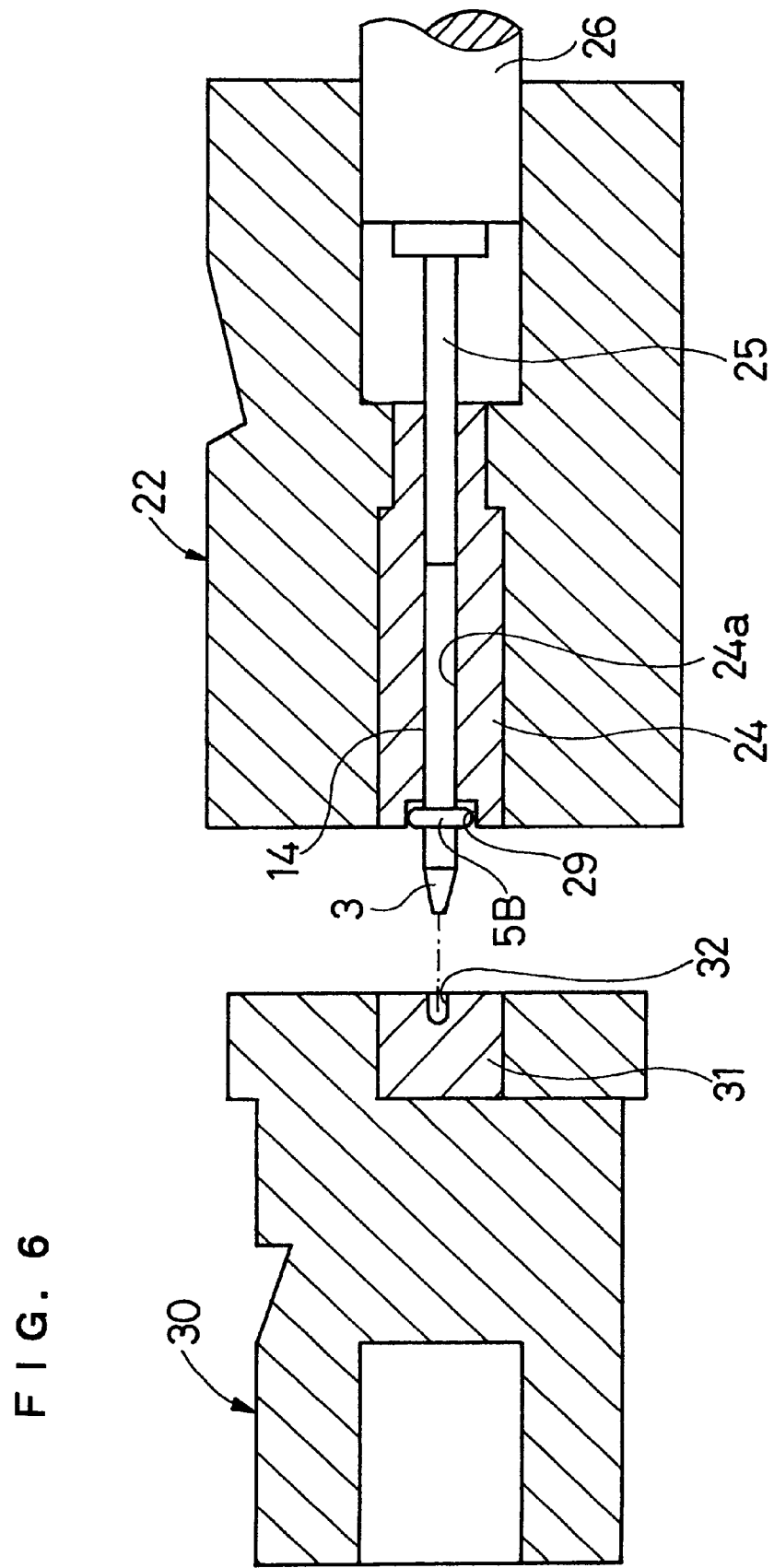
FIG. 6 is a cross sectional view of a main part of another forging device in a third molding step in the embodiment.

The material 14 which has been prepared as stated above is further molded using a forging die device as shown in FIGS. 4 through 7. FIGS. 4, 5 and 6 show the important parts of the forging die device for the first, second and third molding steps, respectively.

The forging die device shown in FIG. 4 is provided with the first fixed die assembly 15 and the first movable die assembly 16. The first fixed die assembly 15 has a first die 17 in the center. Most parts of the material 14 except for the tip 3 are fitted in the center bore 17a of the die 17. The proximal end portion of the material 14 can be pressed with an embossing pin 18 inserted into the same central hole 17a. The embossing pin 18 itself can be pressed by a pressing bar 19. The first movable die assembly 16 is movable toward the first fixed die assembly 15. The movable die assembly 16 has a first punch 20 in the center. The punch 20 has a recessed portion 21 of predetermined shape to mold the flange 5 into intermediate-stage shape (to be referred to as 'intermediate shape' hereinafter) on the surface facing the first die 17.

The forging die device shown in FIG. 5 is provided with the second fixed die assembly 22 and the second movable die assembly 23. The second fixed die assembly 22 has a second die 24 in the center thereof. Most parts of the material 14 except for the tip 3 are fitted in the center bore 24a of the die 24. The proximal end portion of the material 14 can be pressed by an embossing pin 25 inserted into the center bore 24a. The embossing pin 25 itself can be pressed by a pressing bar 26. The second movable die assembly 23 is movable toward the second fixed die assembly 22. The movable die assembly 23 has a second punch 27 in the center thereof. The punch 27 has a recessed portion 28 of predetermined shape provided on the surface facing the second die 24 to mold the flange 5 into an intermediate shape. The shape of the recessed portion 28 is substantially the same as that of the recessed portion 21 of the first punch 20. Unlike the first die 17, the second die 24 has a recessed portion 29 on the surface facing the second punch 27 to mold the flange 5.

The forging die device shown in FIG. 6 is provided with the above-mentioned second fixed die assembly 22 and a third movable die assembly 30. The second fixed die 22 is used by both the third movable die assembly 30 and the second movable die assembly 23. The third movable die assembly 30 is movable toward the second fixed die 22. The third movable die assembly 30 has a third punch 31 in the center thereof. The punch 31 has a recessed portion 32 of predetermined shape on the surface facing the second die 24 to mold a spherical surface 4.

Figure 7:
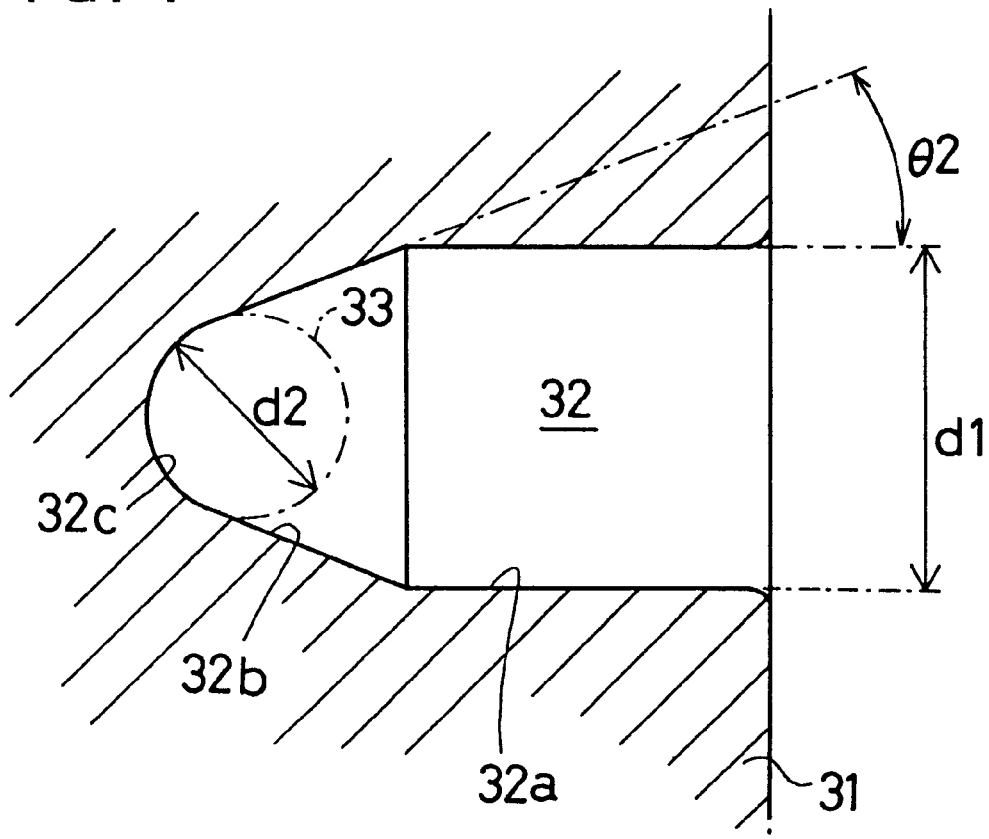
FIG. 7 is a cross sectional and enlarged view of a recessed portion of a third punch of a third movable die used in the third molding step.

FIG. 7 is an enlarged view of the recessed portion 32 of the third punch 31. The recessed portion 32 has a circumferential surface 32a, a tapered surface 32b and a semispherical, recessed surface 32c. The inner diameter $d_1$ of the circumferential surface 32a is set to be slightly larger than the axial diameter $D_1$ of the material 14. The tilt angle $\theta_2$ of the tapered surface 32b is set to be slightly smaller than the tilt angle $\theta_1$ of the tip 3 of the material 14. The semi-spherical recessed surface 32c is a curved surface matching a predetermined virtual sphere 33. In this embodiment, the diameter $d_2$ of the virtual sphere 33 is typically set at 1.3 mm.

Next, description will be given to the first through third molding steps using the above-stated forging die device.

Figure 8:
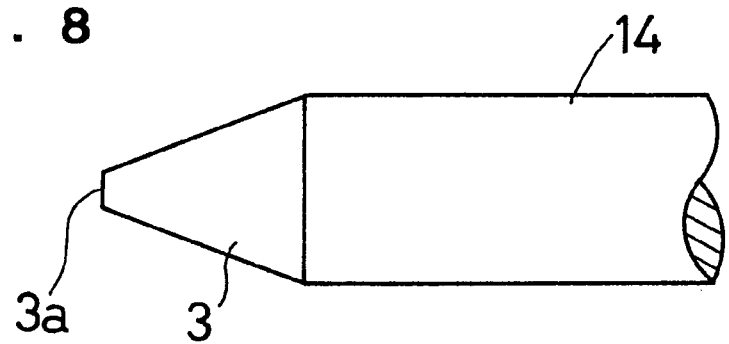
FIG. 8 is an enlarged view of a tip end portion of the material in the embodiment.

First, in the first molding step, the first movable die assembly 16 is moved from the state shown in FIG. 4 toward the fixed die assembly 15 and mold clamp is carried out. As a result, the material 14 shown in FIG. 8 is compressed into the molding state shown in FIG. 9. At this stage, the flange 5 is molded into the first intermediate shape 5A on the material 14.

Thereafter, the first movable die assembly 16 is moved from the above molding state to thereby open the mold. At this time, the material 14 is extruded from the center bore 17a of the first die 17 if the embossing pin 18 is pressed by the pressing bar 19. The tip 3 of the material 14 remains connected to the recessed portion 21 of the first punch 20. The material 14 is moved, together with the first movable die assembly 16, toward the second fixed die assembly 22, to thereby fit the material 14 in the center bore 24a of the second die 24. Thereafter, the material 14 is separated from the first punch 20, and the second movable die assembly 23 in place of the first movable die assembly 16 faces the second fixed die assembly 22. Consequently, as shown in FIG. 5, the stand-by state of the second molding step is obtained.

Figure 9:
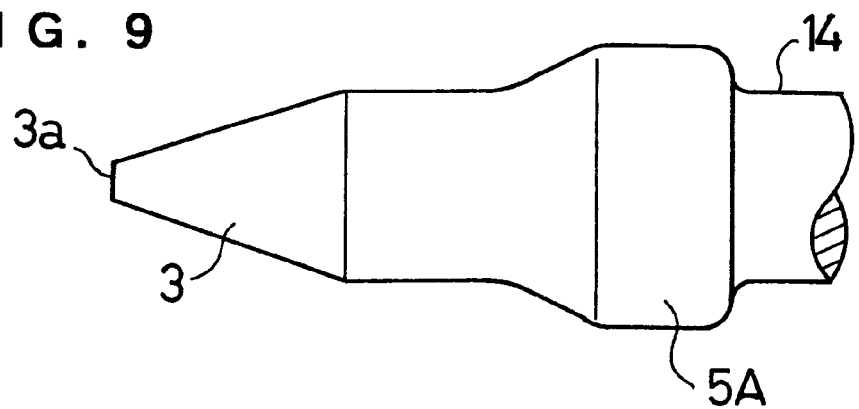
FIG. 9 is an enlarged view of the tip end portion of the material after the first molding step.

Following the first step, in the second molding step, the second movable die assembly 23 is moved from the stand-by state of FIG. 5 toward the second fixed die assembly 22 and mold clamp is carried out. As a result, the material 14 shown in FIG. 9 is further compressed into the molding state shown in FIG. 10. At this stage, the flange 5 is molded into the second intermediate shape 5B on the material 14.

Thereafter, the second movable die assembly 23 is moved from the molding state of the above, and the mold is opened. The third movable die assembly 30, in place of the second movable die assembly 23, faces the second fixed die assembly 22. As a result, the stand-by state for the third molding step is obtained as shown in FIG. 6.

Figure 10:
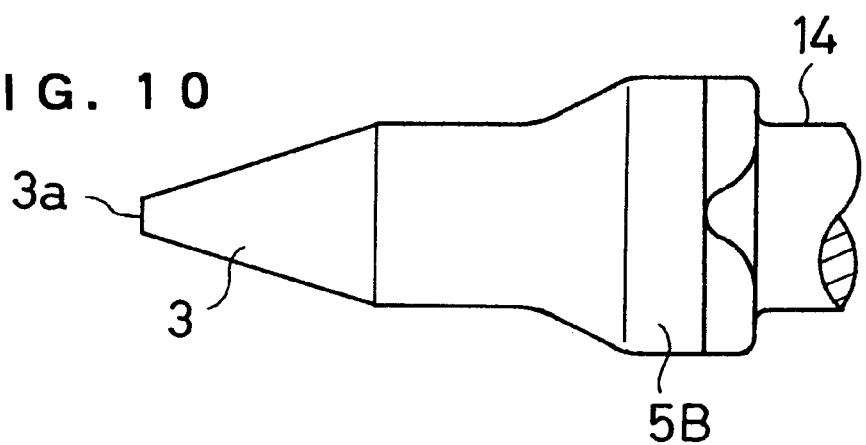
FIG. 10 is an enlarged view of the tip end portion of the material after the second molding step.
Figure 11:
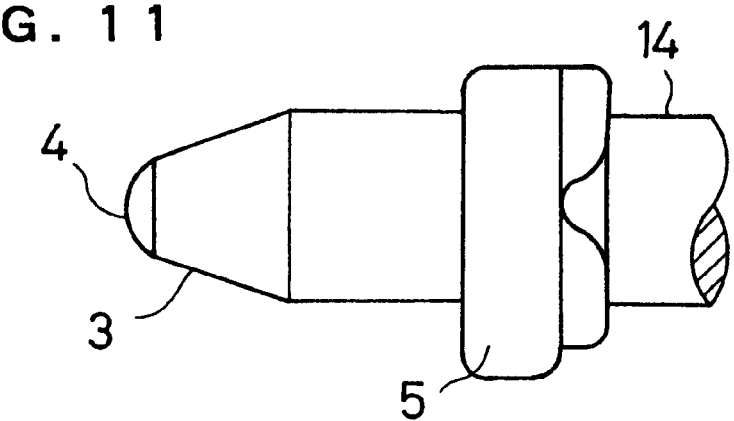
FIG. 11 is an enlarged view of the tip end portion of the material after the third molding step.

In the third molding step, the third movable die assembly 30 is moved from the stand-by state shown in FIG. 6 toward the second fixed die assembly 22 and mold clamping is started. As a result, the material 14 shown in FIG. 10 is further compressed into the molding state shown in FIG. 11. At this stage, the molding of the flange 5 is completed. So is the molding of the spherical surface 4 on the tip end portion of the tip 3. By pressing the embossing pin 25 with the pressing bar 26 to extrude the material 14 from the center bore 24a of the second die 24, the finished valve element 1 is obtained. In this embodiment, the above-stated first to third molding steps correspond to the second step of the present invention.

As described so far, in the manufacturing method according to this embodiment, the tip 3 of the material 14 which has been molded into truncated cone shape in advance is cold-forged by a third punch 31 having a semi-spherical recessed surface 32c. At this time, all parts of the tip 3 of the material 14, starting with the tapered tip end portion 3a, are sequentially pressure-welded to the semi-spherical recessed surface 32c. They are all plastically deformed along the semi-spherical recessed surface 32c, thereby completing the molding of the spherical surface 4. That is, according to the method of the present invention, unlike the conventional method of molding the material 41, such situation does not arise that the remaining grinding undercut of the fill on the periphery of the tip end portion 41a prevents plastic deformation. In this embodiment, the whole parts of the tip end portion 3a of the material 14 are pressure-welded to the semi-spherical recessed surface 32c and the molding of the spherical surface 4 is completed. The reason is as follows. Since the tip 3 of the material 14 is molded into truncated cone shape, the fill on the periphery of the tip 3 can be easily deformed along the semi-spherical, recessed surface 32c. As a result, it is possible to easily mold the high-accuracy spherical surface 4 on the tip end portion of the axial valve element 1 by using a conventional and ordinary cold forging.

Moreover, according to this embodiment, all parts of the tip 3 of the material 14, starting at the region of the tapered tip end portion 3a, are sequentially pressure-welded to the semi-spherical recessed surface 32c in the recessed portion 32 of the third punch 31. Due to this, no air is contained between the recessed portion 32 and the tip end portion 3a of the material 14. It is therefore possible to dispense with an air vent hole provided on the semi-spherical, recessed surface 32c of the third punch 31.

It should be noted that the present invention is not limited to the above-stated embodiment and can be implemented without departing from the concept of the invention. Each of the following modified embodiments can provide the same functions and advantages as those of the above embodiment.

Figure 12:
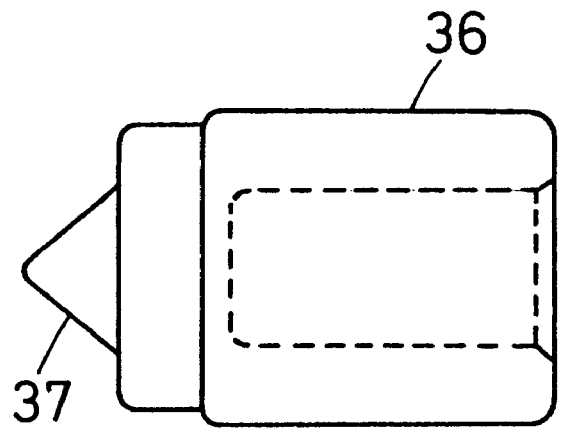
FIG. 12 is an enlarged view of a tip end portion of a different example of a material.
Figure 13:
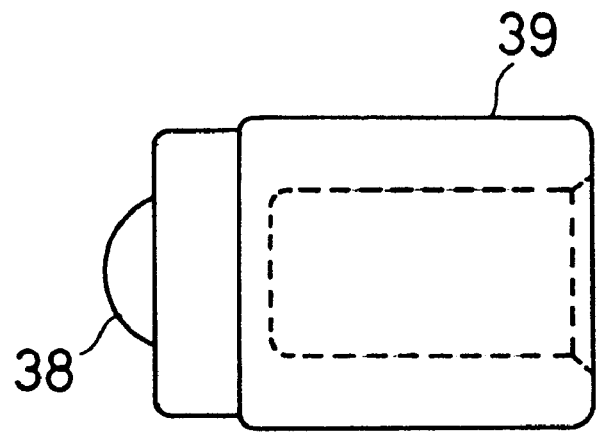
FIG. 13 is an enlarged view of the tip end portion of FIG. 12 after molded.

In the above embodiment, the axial material 14 which is relatively long as shown in FIG. 3 is used to manufacture the relatively long axial valve element 1 having the spherical tip 4 shown in FIG. 1. In place of the material 14, an axial material 36 which is relatively short and has a substantially cone-shaped tip portion 37 as shown in FIG. 12 may be used. This material 36 is to be molded into a relatively short axial valve element 39 having a spherical tip surface 38 as shown in FIG. 13.

Figure 14:
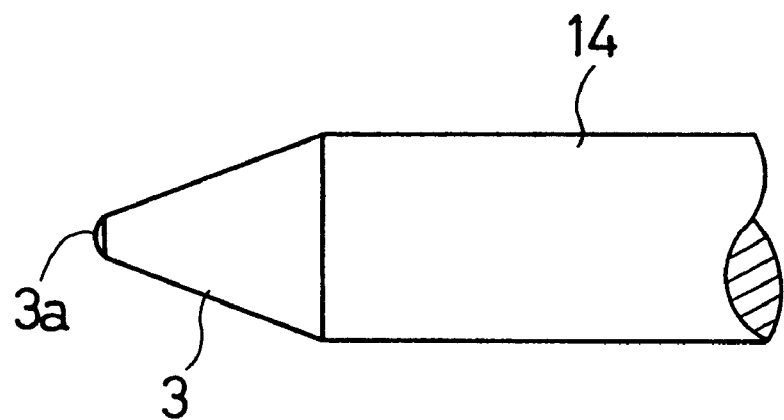
FIG. 14 is an enlarged view of a tip end portion of another different example of a material.

In the above embodiment, as shown in FIGS. 3 and 8, the tip end portion 3 of the material 14 is molded in advance into a truncated cone shape. The tip end portion 3 previously formed into a truncated cone shape may further be molded to have a rough spherical surface on the tip 3a as shown in FIG. 14.

Figure 15:
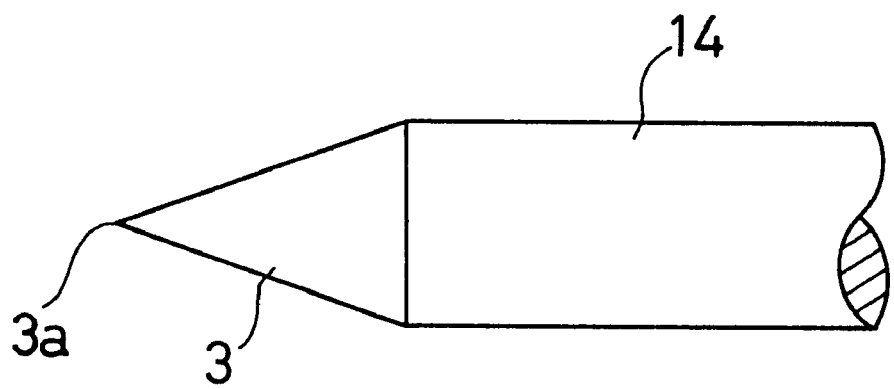
FIG. 15 is an enlarged view of the tip end portion of FIG. 14 after molded.
Figure 16:
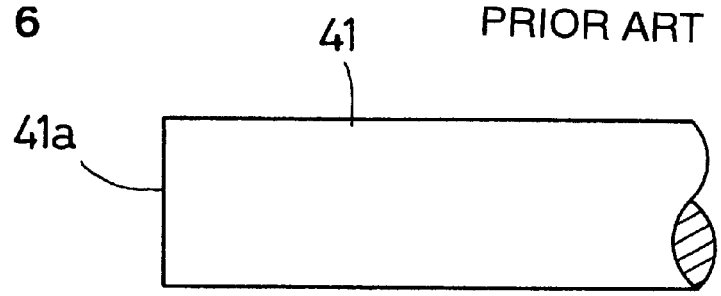
FIG. 16 is an enlarged view of a tip end portion of a conventional material.
Figure 17:
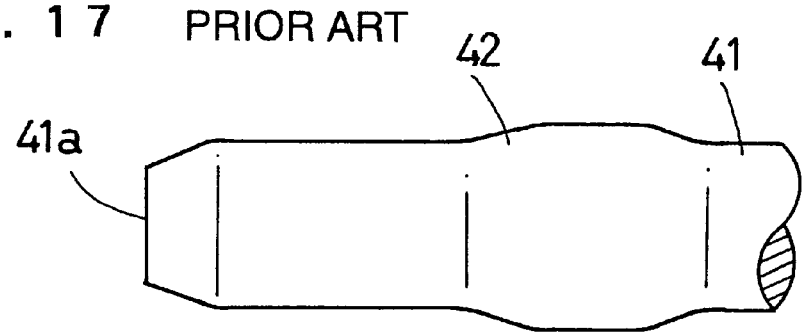
FIG. 17 is an enlarged view of the conventional material during a manufacturing process to form a special flange 42.
Figure 18:
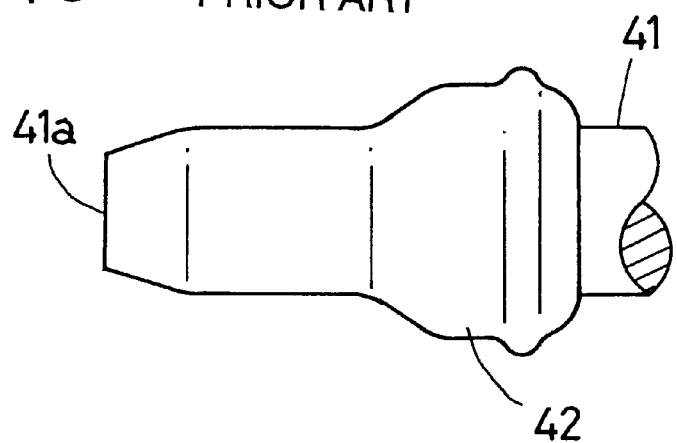
FIG. 18 is an enlarged view of the conventional material during a manufacturing process to form a special flange 42.
Figure 19:
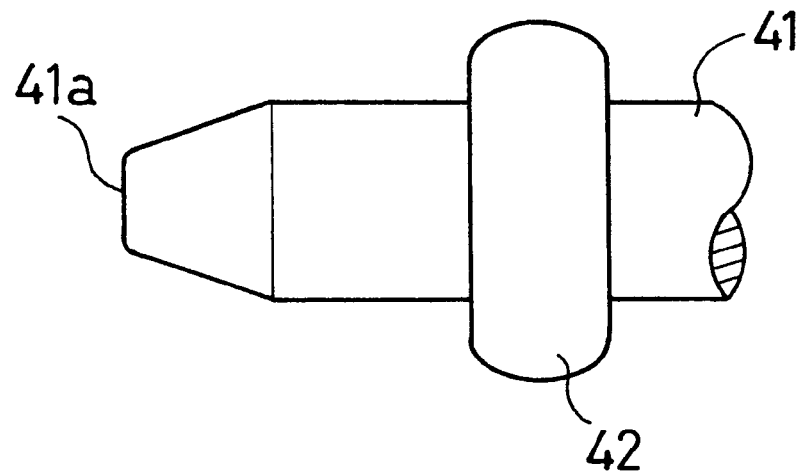
FIG. 19 is an enlarged view of the conventional material with a spherical surface.
Figure 20:
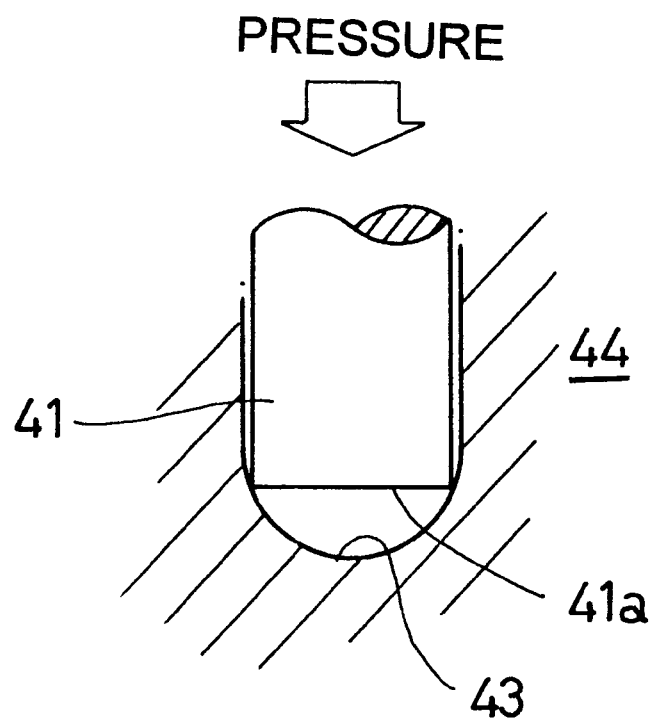
FIG. 20 is a conceptual view showing a part of a conventional die and a tip end of a material.

The tip end portion 3 of the material 14 may be molded in advance into a cone shape as shown in FIG. 15.

In the above embodiment, although the tip end portion 3 is formed into a truncated cone shape by cutting, it may be formed into such the shape by forging.

Although the valve element 1 in the above embodiment is formed with the flange 5, it may be molded without flange.

The material 14 is molded by cold forging to form a spherical surface on the tip end in the above embodiment. However, the material 14, depending on the composition thereof, may be subjected to hot forging.

Although the material 14 made of stainless steel is used, different materials, for example, iron, may be used.

What is claimed is:

1. A method of manufacturing a valve element having a spherical surface on a tip end thereof by forging an axial material having a diameter, the method including the steps of:

forming an end of the material to provide a tapered end portion having a tip end of a diameter that is about one-tenth the diameter of the axial material, the tapered end portion being shaped as a cone or a truncated cone; and forging the tapered end portion with a mold die having a semi-spherical recessed surface to shape the tip end of the tapered end portion into a spherical surface, the semi-spherical recessed surface having a diameter larger than the diameter of the tip end of the tapered end portion.

2. The method of manufacturing the valve element according to claim 1, wherein the mold die includes a circumferential surface having a central axis and a diameter larger than that of the axial material, and a tapered surface having an angle of inclination relative to the central axis that is smaller than a corresponding angle of the tapered end portion.

* * * * *